(12) United States Patent
Powell et al.

(10) Patent No.: US 10,702,105 B2
(45) Date of Patent: *Jul. 7, 2020

(54) DUAL MOTOR APPARATUS

(71) Applicant: Chirp Products LLC, Pleasant Grove, UT (US)

(72) Inventors: Steven D. Powell, Provo, UT (US); Michael Chad Makay, Santa Clara, CA (US)

(73) Assignee: CHIRP PRODUCTS, LLC., Pleasant Grove, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/283,735

(22) Filed: Feb. 22, 2019

(65) Prior Publication Data

US 2019/0183295 A1 Jun. 20, 2019

Related U.S. Application Data

(63) Continuation of application No. 15/993,617, filed on May 31, 2018, now Pat. No. 10,213,065, which is a (Continued)

(51) Int. Cl.
*A46B 15/00* (2006.01)
*A46B 13/00* (2006.01)
(Continued)

(52) U.S. Cl.
CPC ............ *A47K 7/043* (2013.01); *A46B 5/0095* (2013.01); *A46B 13/008* (2013.01); *A46B 13/02* (2013.01); *A46B 15/0006* (2013.01); *A46B 15/0012* (2013.01); *A46B 15/0048* (2013.01); *A46B 15/0085* (2013.01); *A47K 7/04* (2013.01);
(Continued)

(58) Field of Classification Search
CPC .............. A46B 5/0095; A46B 15/0085; A46B 15/0048; A46B 15/0012; A46B 2200/1046; A46B 13/008; A46B 13/02; A46B 2200/102; A46B 15/0006; A47K 7/043; A47K 7/04; B08B 1/002; B08B 7/04

See application file for complete search history.

(56) References Cited

U.S. PATENT DOCUMENTS 4,378,804 A 4/1983 Cortese
D276,480 S 11/1984 Nigro
(Continued)

FOREIGN PATENT DOCUMENTS

CN 102008359 A 4/2011
CN 303110427 2/2015
(Continued)

OTHER PUBLICATIONS

International Search Report for PCT/US2018/042059.
(Continued)

*Primary Examiner* — Alexander Markoff
(74) *Attorney, Agent, or Firm* — HIPLegal LLP; Judith Szepesi

(57) ABSTRACT

An apparatus comprising a first motor to control a rotation and a second motor to control a vibration of a moving portion of the apparatus. In one embodiment, the apparatus further comprises a controller to control of a ratio between the rotation and the vibration.

18 Claims, 13 Drawing Sheets

Related U.S. Application Data continuation of application No. 15/161,164, filed on May 20, 2016, now Pat. No. 10,022,025.

(51) Int. Cl.
*A46B 5/00* (2006.01)
*B08B 7/04* (2006.01)
*A47K 7/04* (2006.01)
*A46B 13/02* (2006.01)
*B08B 1/00* (2006.01)

(52) U.S. Cl.
CPC ............ *B08B 1/002* (2013.01); *B08B 7/04* (2013.01); *A46B 2200/102* (2013.01); *A46B 2200/1046* (2013.01)

(56) References Cited

U.S. PATENT DOCUMENTS

| | | | |
|---|---|---|---|
| 4,919,117 A | 4/1990 | Muchisky et al. | |
| D319,120 S | 8/1991 | Kuhn | |
| 5,909,720 A | 6/1999 | Yamaoka et al. | |
| 6,032,313 A | 3/2000 | Tsang | |
| D439,052 S | 3/2001 | Hay | |
| 6,278,195 B1 | 8/2001 | Yamaguchi et al. | |
| 6,359,800 B1 | 3/2002 | Liang et al. | |
| 6,359,900 B1 | 3/2002 | Dinakar et al. | |
| 6,598,255 B1 | 7/2003 | Gohda et al. | |
| D523,809 S | 6/2006 | Roth et al. | |
| 7,157,816 B2 | 1/2007 | Pilcher et al. | |
| D549,964 S | 9/2007 | Roth et al. | |
| 7,267,673 B2 | 9/2007 | Pilcher et al. | |
| 7,320,691 B2 | 1/2008 | Pilcher et al. | |
| 7,386,906 B2 | 6/2008 | Roth et al. | |
| D601,803 S | 10/2009 | Reishus et al. | |
| 7,757,327 B2 | 7/2010 | Filsouf | |
| 7,786,626 B2 | 8/2010 | Reishus et al. | |
| 7,789,092 B2 | 9/2010 | Akridge et al. | |
| D634,707 S | 3/2011 | Hosier et al. | |
| D635,294 S | 3/2011 | Hosler et al. | |
| 8,032,965 B2 | 10/2011 | Asada et al. | |
| 8,177,450 B2 | 5/2012 | Zhang | |
| D663,893 S | 7/2012 | Hosler et al. | |
| 8,272,862 B2 | 9/2012 | Pilcher et al. | |
| D683,139 S | 5/2013 | Chikos et al. | |
| 8,468,634 B2 | 6/2013 | Iwahori et al. | |
| 8,469,909 B2 | 6/2013 | Pilcher et al. | |
| 8,500,754 B2 | 8/2013 | Hull | |
| 8,530,484 B2 | 9/2013 | Akridge | |
| 8,595,887 B2 | 12/2013 | Hiltmann | |
| 8,641,702 B2 | 2/2014 | Pilcher et al. | |
| 8,661,596 B2 | 3/2014 | Jungnickel et al. | |
| 8,668,618 B2 | 3/2014 | Sappenfield | |
| 8,684,883 B2 | 4/2014 | Sappenfield | |
| 8,740,917 B2 | 6/2014 | Pilcher et al. | |
| 8,813,292 B2 | 8/2014 | Driesen et al. | |
| 9,032,576 B2 | 5/2015 | Zelickson et al. | |
| 9,089,390 B2 | 7/2015 | Klemm et al. | |
| D743,174 S | 11/2015 | Berg | |
| D744,755 S | 12/2015 | Reishus et al. | |
| D770,181 S | 11/2016 | Reishus et al. | |
| D771,951 S | 11/2016 | Reishus et al. | |
| 10,022,025 B2 * | 7/2018 | Powell | A46B 5/0095 |
| 10,213,065 B2 * | 2/2019 | Powell | A46B 5/0095 |
| 2007/0011836 A1 | 1/2007 | Brewer et al. | |
| 2007/0220689 A1 | 9/2007 | Choi | |
| 2007/0245506 A1 | 10/2007 | Clements | |
| 2008/0160509 A1 | 7/2008 | Akridge et al. | |
| 2009/0306577 A1 | 12/2009 | Akridge et al. | |
| 2010/0222719 A1 | 9/2010 | Cowie et al. | |
| 2010/0300479 A1 | 12/2010 | Reishus et al. | |
| 2011/0067194 A1 | 3/2011 | Al-Qaffas | |
| 2011/0082409 A1 | 4/2011 | Reishus et al. | |
| 2011/0290052 A1 | 12/2011 | Sappenfield | |
| 2012/0165710 A1 | 6/2012 | Nichols | |
| 2012/0202641 A1 | 8/2012 | Sappenfield | |
| 2012/0233798 A1 | 9/2012 | Brewer et al. | |
| 2013/0060176 A1 | 3/2013 | Nichols | |
| 2013/0097789 A1 | 4/2013 | Fischer et al. | |
| 2014/0096332 A1 | 4/2014 | Kitagawa et al. | |
| 2014/0310900 A1 | 10/2014 | Curry et al. | |
| 2015/0034113 A1 | 2/2015 | Yamagishi et al. | |
| 2015/0132041 A1 | 5/2015 | Muraki et al. | |
| 2015/0148685 A1 | 5/2015 | Baym et al. | |
| 2015/0174387 A1 | 6/2015 | McInnes et al. | |
| 2015/0202114 A1 | 7/2015 | Pardoel et al. | |
| 2015/0313354 A1 | 11/2015 | Mongan et al. | |
| 2015/0327965 A1 | 11/2015 | Garrigues | |
| 2016/0045081 A1 | 2/2016 | Kern | |
| 2016/0183671 A1 | 6/2016 | Skidmore | |
| 2016/0206087 A1 | 7/2016 | Skidmore et al. | |
| 2016/0270509 A1 | 9/2016 | Shahrur et al. | |
| 2016/0284208 A1 | 9/2016 | Pfenniger et al. | |
| 2017/0049278 A1 | 2/2017 | Thomassen | |

FOREIGN PATENT DOCUMENTS

| | | |
|---|---|---|
| CN | 303129383 | 3/2015 |
| CN | 303146118 | 3/2015 |
| CN | 204234378 U | 4/2015 |
| CN | 303751033 | 7/2016 |
| EP | 2868293 A1 | 5/2015 |
| KR | 3007253420000 | 1/2014 |
| MX | 0256860001 | 9/2008 |
| WO | 02071970 A1 | 9/2002 |
| WO | 2015169606 A1 | 11/2015 |

OTHER PUBLICATIONS

PCT Written Opinion for PCT/US2018/042059.
PCT/US2017/038197, International Search Report, dated Aug. 25, 2017, 2 pages.
PCT/US2017/038197, Written Opinion of the International Searching Authority, dated Aug. 25, 2017, 7 pages.
Philips Leaflet, Koninklijke Philips Electronics N.V., <http://www.p4c.philips.com/cgi-bin/cpindex.pl?scy=IT&cslg=EN&ctn=SC5370/10>, Issue date Apr. 21, 2016, Downloaded on Jun. 13, 2016, 3 pages.
Philips User Manual, Koninklijke Philips Electronics N.V., <http://www.p4c.philips.com/cgi-bin/cpindex.pl?scy=IT&cslg=EN&ctn=SC5370/10>, Downloaded on Jun. 13, 2016, 56 pages.
Chinese Patent Office Office Action for Chinese Application 2017800345329 dated Nov. 27, 2019, Original and Translation (7 pages).
Chinese Patent Office Search Report for Chinese Application 2017800345329 dated Nov. 27, 2019 (2 pages).

* cited by examiner

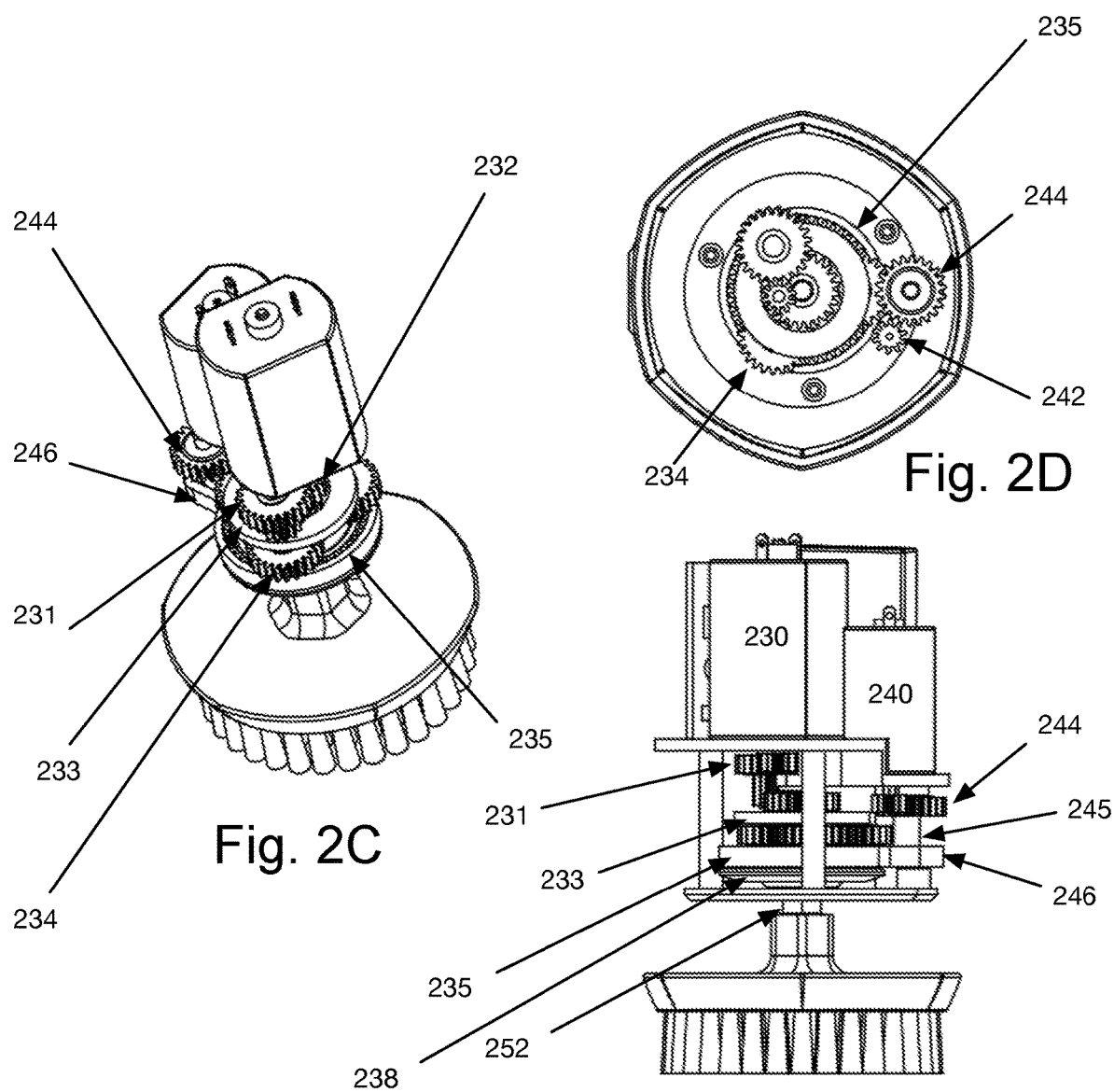

DUAL MOTOR APPARATUS

RELATED APPLICATION

The present application is a continuation of U.S. patent application Ser. No. 15/993,617 filed on May 31, 2018, and issuing on Feb. 26, 2019 as U.S. Pat. No. 10,213,065, which is a continuation of U.S. Pat. No. 10,022,025 which issued on Jul. 17, 2018. These applications are incorporated by reference in their entirety.

FIELD

The present invention relates to devices, and more particularly to a dual motor device including sonic and rotational motion.

BACKGROUND

Brushes and other motorized devices are used for various purposes. Facial brushes often used by women and men to wash their face. Facial brushes can help improve skin tone, reduce breakouts and blemishes, and improve the application of moisturizers and crèmes. Cleaning brushes are used to dean in various environments including the home and office.

Currently there are rotating brushes, where the bristles rotate in a circular motion, to improve cleansing. Rotating bristles are useful to get the soap into the nooks and crannies of the user's face. They are also good for lathering soap.

There are also sonic brushes, in which have bristles that oscillate, rather than rotate. Sonic brushers are good at loosening embedded dirt and applying lotions.

BRIEF DESCRIPTION OF THE FIGURES

The present invention is illustrated by way of example, and not by way of limitation, in the figures of the accompanying drawings and in which like reference numerals refer to similar elements and in which:

FIG. 2A-2E are various interior views of one embodiment of the brush.

DETAILED DESCRIPTION

A device which combines rotation and sonic vibration is described. In one embodiment, the rotation is micro-rotation, combining rotation with sonic vibrations. The device allows the setting of the ratio between rotation and vibration. In one embodiment, both the rotation and the vibration may be varied between 0 and 100%. In one embodiment, the sonic vibration may be adjusted between 0 and 50,000 pulses per minute, and the rotation may be adjusted between 0 and 2000 rotations per minute (RPM). In one embodiment, the user may adjust a ratio between rotation and vibration. In one embodiment, the speed of vibration and the speed of rotation may also be adjusted. By providing a dual motor apparatus, the user experience is improved. In this mechanism, the system utilizes a planetary gear system, in which the ring gear can be imparted with a sonic vibration that is additive to the otherwise rotary output.

In one embodiment, the brush also comes with a cap, which provides a location for the brush when it is not in use. In one embodiment, the cap is a storage location, which allows drying of the brush. In one embodiment, the cap also provides a way to lead water and remaining preparation from the brush to the sink, to prevent a mess. In one embodiment, the cap also provides sanitizing to maintain the brush.

In one embodiment, the brush also communicates with a brush head, and may adjust the speed and/or ratio based on the type of brush head being used. The brush may also adjust based on the kind of cleanser or lotion being used. In one embodiment, this communication uses RFID tags or other passive communication on the brush head and/or cleanser/lotion jar, which is read by the facial brush. In one embodiment, sensors within the brush control the speed of the movement, and sense when the brush is not in contact with the user's face (or hand), or other appropriate use, and automatically turn off rotation, to reduce splatter. In one embodiment, sensors in the brush can adjust the speed, direction, and ratio of movement in response to sensing. In one embodiment, a richer user interface is provided using a mobile device which can communicate with the hybrid brush.

The following detailed description of embodiments of the invention makes reference to the accompanying drawings in which like references indicate similar elements, showing by way of illustration specific embodiments of practicing the invention. Description of these embodiments is in sufficient detail to enable those skilled in the art to practice the invention. One skilled in the art understands that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

Figure 1:
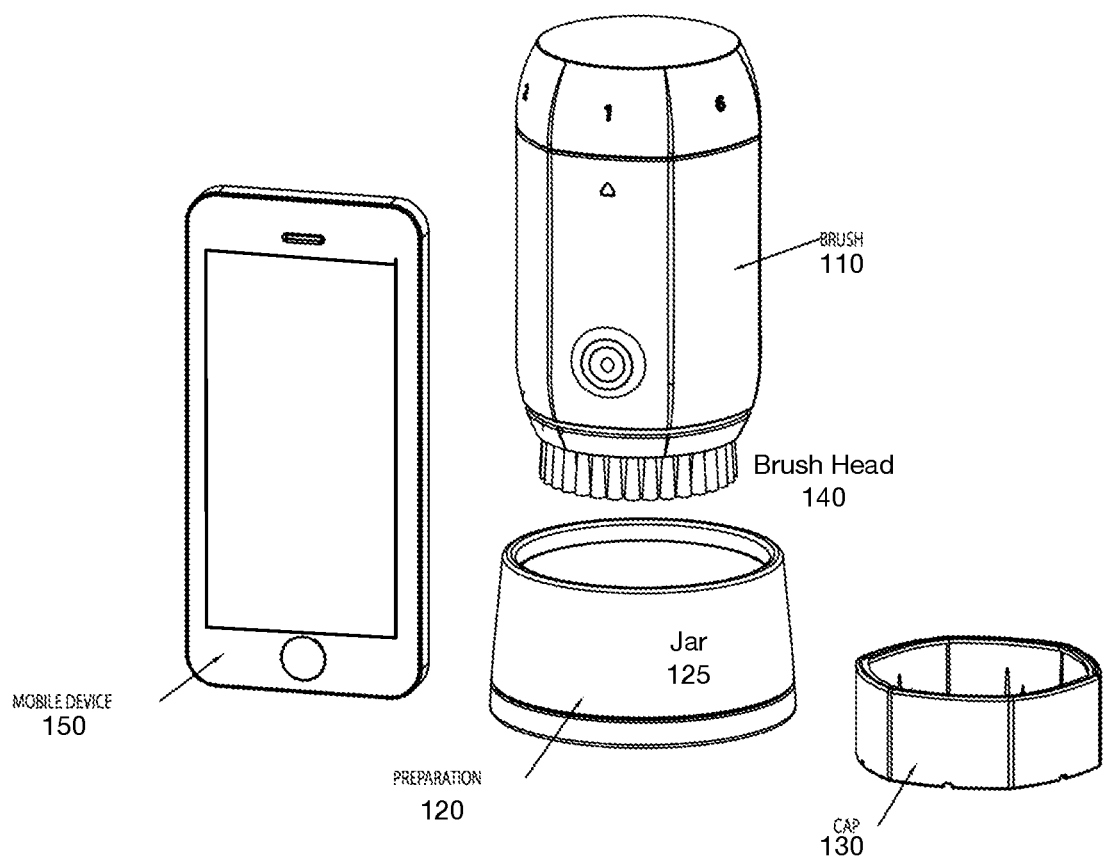
FIG. 1 is an illustration of one embodiment of the brush and drainage cap, an associated preparation, and a mobile device which may be associated with the system.

FIG. 1 is an illustration of one embodiment of the brush and drainage cap, an associated preparation, and a mobile device which may be associated with the system. The brush 110, in one embodiment, provides a combination of rotation and sonic vibration, for cleaning. The brush 110, in one embodiment, is a facial brush. Alternatively, the brush may be a toothbrush, cleaning brush, scrubbing brush, dish washing brush, or other kind of brush. The configuration for the brush 110 shown is merely exemplary, and the appearance may be quite different. The brush includes a body and a removably attached brush head, in one embodiment.

In one embodiment, the brush 110 is designed to be used with one or more types of preparations 120. A preparation 120 may be a lotion, soap, cleanser, crème, or other material which may be used with the brush. In one embodiment, the preparation 120 may be distributed in a jar or other container 125. This container may include a passive indicator, such as RFID, identifying the particular preparation 120 in the container 125. In one embodiment, this may be read by the brush 110, and used to adjust the rotation/vibration ratio or other settings.

The brush 110 in one embodiment may be placed in a drainage cap 130, designed to keep any remaining water or preparation from creating a mess. In one embodiment, the drainage cap 130 may include a sanitizing feature. In one embodiment, the sanitizing feature is a UV element, which provides sanitizing. In one embodiment, the brush 110 may also utilize its vibration capability at a low frequency to "shake off" the remaining water and/or preparation on the brush head when it is placed in the drainage cap 130. This may be triggered automatically when a charging element is connected to the drainage cap 130.

In one embodiment, the brush 110 includes a plurality of different brush heads 140. The brush heads may have bristles, massagers, rough surface, nubs, silicone, fibers, bristles made of various materials including silicon, nylon, silk, or other materials, or may have a disk, pad, or another form. The brush head 140 may be optimized for applying a preparation, exfoliation, microdermabrasion, massaging, acne management, etc.

In one embodiment, the brush head 140 may include a passive indicator, such as RFID or other Automatic Identification and Data Capture (AIDC) mechanism. This enables the brush 110 to adjust to the particular brush head 140, for example changing the ratio of rotation to vibration, changing RPM or frequency, or changing rotational direction. For example, the optimal movement pattern for the brush head may be different for microdermabrasion v. massage v. cleaning the skin. Other adjustments may also be made. In one embodiment, the combination of the brush head 140 and preparation 120 being used may be utilized to identify the condition of the user or target for the brush 110. This may be used to adjust the brush behavior. For example, if the brush head 140 and/or the preparation 120 indicate that the user has acne, the brush 110 may adjust its routine to optimize it to reduce acne.

In one embodiment, the brush 110 may communicate with a mobile device 150. In one embodiment, the brush 110 and mobile device 150 may be coupled via a network connection, such as a local area network like BLUETOOTH™. The mobile device 150 may provide a user interface enabling the user to communicate with the brush 110. In one embodiment, the mobile device 150 may also allow the user to share his or her brush experience with others, provide feedback to the manufacturer, etc.

Figures 2A, 2B:
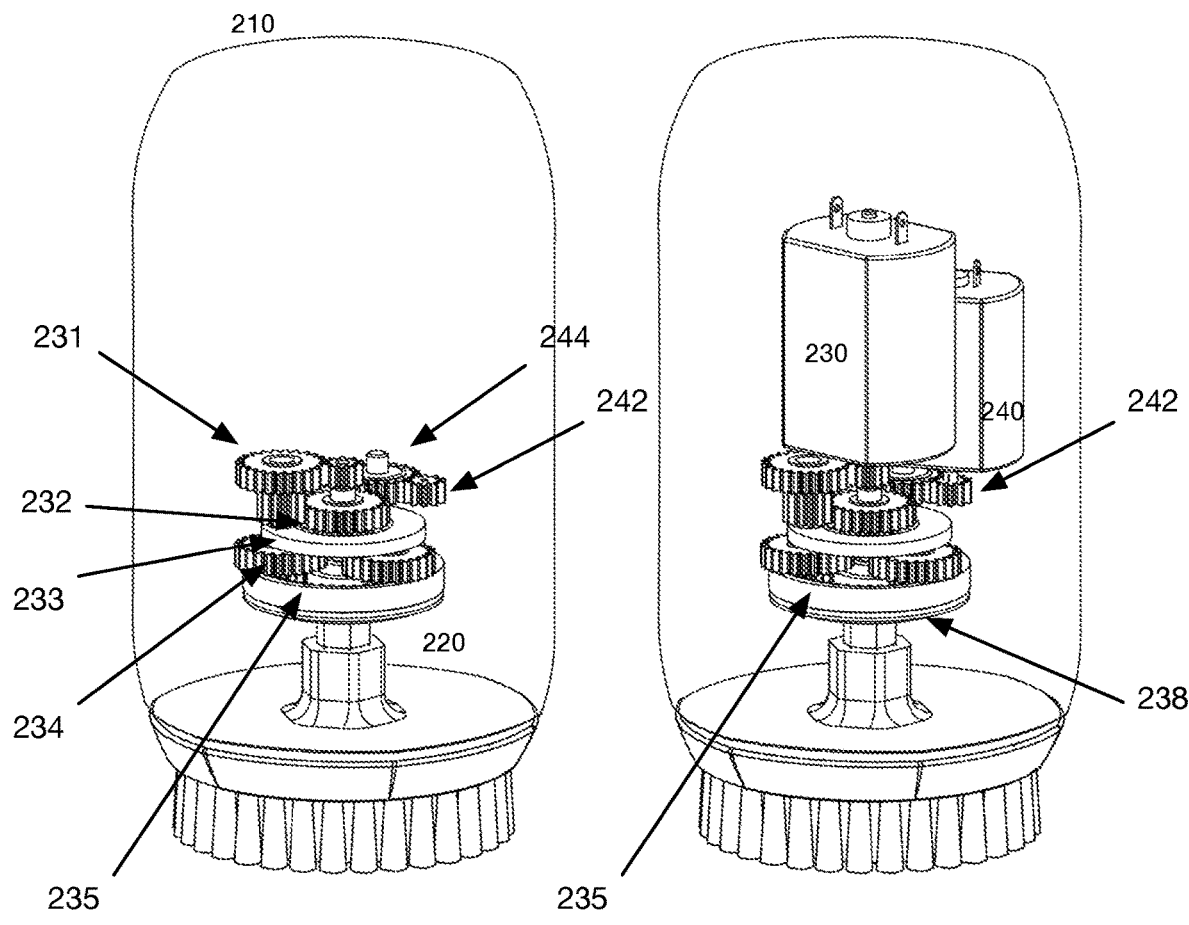

FIG. 2A is an interior view of one embodiment of the brush. An exemplary brush body 210 is shown in outline. The gearing 220 inside is used to combine motion from the rotation motor 230 and sonic vibration motor 240. In one embodiment, planetary gearing is used, in which the gearing combines the rotation from rotation motor 230 with the vibration from vibration motor 240 to create micro-rotations. In one embodiment, the vibration motor 240 drives the motion of the annulus or ring gear 235. The rotation motor 230 drives the sun gear 232. The planetary gears 234 can be driven by the sun gear 232, the ring gear 235, or both the sun gear 232 and the ring gear 235. The ring gear 235 sums those motions and moves the cover 238 to which the brush is affixed.

In one embodiment, the planetary gearing permits adjustment of the rotation and vibration, and their ratios. FIG. 2A shows the exemplary gearing, without the motors. FIG. 2B shows both motors, rotation motor 230, and sonic vibration motor 240. FIG. 2C shows the gearing and motors from a different perspective and shows the loop 246 which is attached to the ring gear 235 and through which the sonic vibration motor 240 moves the ring gear 235 back and forth in sonic vibration.

FIG. 2D shows the gearing from below, showing an exemplary planetary gearing 234, as well as the gears 242 and 244 which couple the sonic vibration motor 240 to the ring gear 235. The carrier 233 is coupled to the cover 238, which moves the shaft 252. FIG. 2E shows the gearing and motors from a different angle. The sonic vibration motor 240 moves the ring gear 235, the ring gear 235 moves the planetary gears 234 which moves the carrier 233 which moves the cover 238 which moves the shaft 252. The rotation motor 230 drives the sun gear 232 which drives the planetary gears 234 which move the carrier 233 which moves the cover 238 which moves the shaft 252. When both the sonic vibration motor 240 and the rotation motor 230 are active, the shaft 252 is driven by cover 238 which is driven by carrier 233 which is the sum of the movement through planetary gears 234 and ring gear 235.

It should be understood that the configuration shown is merely an exemplary configuration. The appearance of the brush, brush head, gearing, and motors may be altered.

Figure 2F:
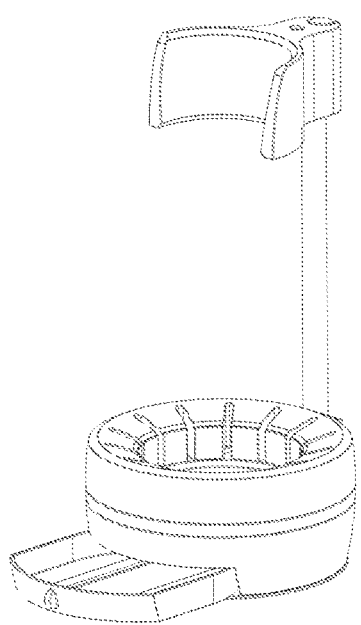
FIGS. 2F-2H are various views of one embodiment of the brush base, or drainage cap.
Figure 2G:
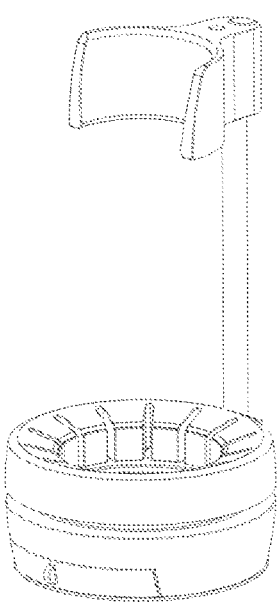
Figure 2H:
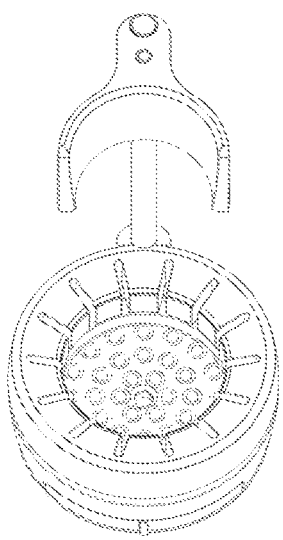

FIGS. 2F-2G show an embodiment of the drainage cap, including charging stand and sanitizer. The drainage cap is designed to fit the brush, standing upright. The standing arm supports the brush upright, allowing it to drip dry, in one embodiment. A drawer, in one embodiment, captures the water. In another embodiment, a drain path to the sink may be provided. The brush head would be within the cup portion of the drainage cup. In one embodiment, UV, provided through one or more LEDs, may be used to sanitize the brush head. In one embodiment, the drainage cap also provides a simple inductive charging station, such that the brush is charged when it is in the drainage cap.

Figure 3:
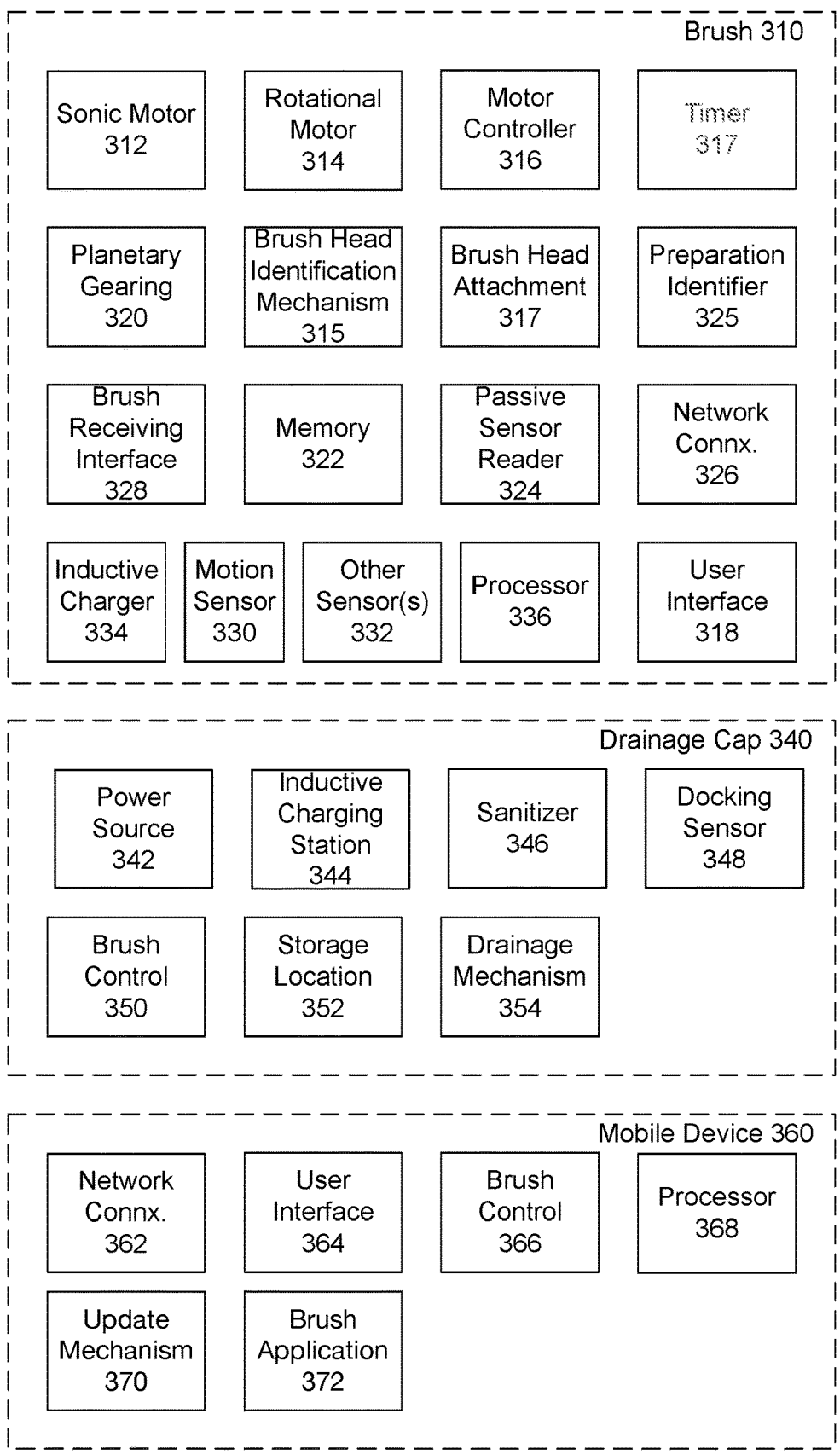
FIG. 3 is a block diagram of the elements of the brush.

FIG. 3 is a block diagram of one embodiment of the elements of the brush, drainage cap, and mobile device. The system includes the brush 310, drainage cap 340, and mobile device 360. The system also interacts, in one embodiment, with preparation jar (not shown).

The brush 310 in one embodiment has a brush head attachment 317, to which a brush head is attached. It includes a sonic motor 312 and rotational motor 314, the movement of which is combined by planetary gearing 320 controls the rotation and vibration of the brush head. The motors, in one embodiment, are controlled by motor controller 216, which sets the ratio between the sonic and rotational speeds. In one embodiment, the motor controller 316 sets the ratio based on user settings, which may be entered via brush user interface 318, or received via network connection 326, or automatically set, as will be described below.

In one embodiment, the brush 310 communicates with a passive identification mechanism in a brush head or preparation via passive sensor reader 324. The data is received by the passive sensor reader 324 is used by the brush head identification mechanism 315 or preparation identifier 325. In one embodiment brush head identification mechanism 315 may receive data from brush receiving interface 328, and identification may be based on mechanical fitting rather than on RFID or similar electronic data. For example, brush heads may have an encoded set of "bumps" or other structural In one embodiment, the same RFID reader may act as brush head identification mechanism 315 and preparation identifier 325. In one embodiment, the identification is based on a data about the available brush heads or preparations in memory 322. In one embodiment, this data is initially added into the memory 322 of the brush 310 at manufacture. In one embodiment, this data maybe updated via the mobile device 360, as new preparations and/or brush heads become available, using network connection 326. In one embodiment, the brush 310 may communicate directly with a server via network connection 326. In one embodiment, network connection may include one or more of Bluetooth, other near field network connections, wireless connections, cellular connections, etc.

Inductive charger 334 enables the brush 310 to be charged without being plugged in. In one embodiment, the drainage cap 340 may provide an inductive charger plug, enabling the brush 310 to be automatically charged when it's in the drainage cap 340.

In one embodiment, brush 310 may also include a motion sensor 330, which may include one or more gyroscopes, accelerometers, and/or other sensors 332. Other sensors 332 may include pressure sensors, contact sensors, and other types of sensors which can provide data about how the brush is being used. Sensors 330, 332 may be used to detect the use of the brush 310. For example, motion sensor 330 may detect how the user is utilizing the brush. Other sensors 332 may include proximity, touch, pressure, and other sensors that enable the brush to detect how it is being used. In one embodiment, the sensor data may be used by processor 336 to adjust the rotation and/or vibration of the brush head. For example, the system may detect when the user is in a crease of the face, such as the nose, and alter the direction of rotation or ratio of rotation to vibration, to optimize the brush's movement for the detected location. In one embodiment, the sensors 330, 332 may be used to detect when the user is attempting to foam up a foaming cleanser in a jar or in the hand, and change the movement to optimize foaming action. Other adjustments may be made based on sensor data.

In one embodiment, the brush head identification mechanism 315 may also be used to trigger a notification, delivered either via user interface 318 or through mobile processor 360, that the user should refresh their brush. Other determinations, such as suggested changes in usage pattern, pressure level, etc. may also be provided.

As noted above, the brush 310 is designed to rest in drainage cap 340 when it is not in use. Storage location 352 provides a "cap" into which the brush 310 may be placed. In one embodiment, then drainage cap includes a drainage mechanism 354, may capture the water from the brush, or leads any water or remaining preparation from the brush into the sink when the brush is in the storage logic 352, without making a mess on the counter, or wherever the brush is stored. The drainage cap 340 may be designed to be portable, so that the brush can be securely stored for travel. In one embodiment, the drainage cap 340 may be made of multiple separate pieces, so that the storage location 352 may travel, with some or all of the remaining elements.

The drainage cap 340 in one embodiment includes a power source 342, which may be a battery or a wall plug, or a combination of a battery & wall plug, which enables it to provide an inductive charging station 344 for the brush 310. When the brush is placed in the drainage cap 340, in one embodiment, the positioning of the charger portion of the station 344 is such that it automatically is coupled to inductive charger 334 in brush 310, enabling the brush to be charged.

In one embodiment, drainage cap 340 includes a docking sensor 348 which senses when the brush 310 is placed in the drainage cap. This may be through a separate sensor, or through sensing that the inductive charging station 344 has started charging the brush.

In one embodiment, drainage cap 340 includes a sanitizer 346, which sanitizes the brush head. The sanitizer 346 may be an ultraviolet (UV) system, as is known in the art. Other types of sanitization mechanisms may be used.

In one embodiment, prior to sanitization, the drainage cap may cause the brush to "shake off" the remaining water and/or preparation. This may be done via brush control 350 instructing the motor controller 316 to temporarily activate the brush head. In another embodiment, the brush 310 may utilize sensors 330, 332 to detect placement in drainage cap 340 and self-activate to shake off the remaining water. In that instance, drainage cap 340 need not have a brush control 350.

In one embodiment, brush 310 communicate with mobile device 360. Mobile device 360 may be a smart phone, tablet, or similar device. In one embodiment, mobile device 360 includes a processor 368, user interface 364, and network connection 362. These elements may be used by brush application 372. Brush application 372 interacts with brush 310 via network connection, in one embodiment. The brush application 372 displays various usage data to the user, in one embodiment. In one embodiment, the user may also use the brush application 372 to update the data on the brush 310. As noted above, in one embodiment, the rotation and vibration of the brush may be set at various ratios.

In one embodiment, brush control 366 enables the mobile device 360 to update the brush 310. In one embodiment, the brush 310 may have 5-15 preset speeds and ratios, from which the user can select. These preset ratios may be optimized for various types of preparations, skins, and users, for a facial brush. For a cleaning brush, the ratios may be optimized for various types of cleaning. In one embodiment, the available preset ratios may be updated via the brush application 372. In one embodiment, the user may manually set these ratios, via user interface 364. In one embodiment, these ratios may be reset based on user data received by the mobile device 360, such as data on the user's skin type, skin regimen, habits, and age. In one embodiment, the preferred settings based on the user data may be sent by a server (not shown) which collects collective data from many users, and reviews of various settings.

In one embodiment, the mobile device 360 may communicate with a server. In one embodiment, the update mechanism 370 enables the mobile device 360 to receive updates from the server, and update the settings in the brush 310. This may be useful, for example, to update the preparations and brush head types in memory 322 of brush 310, or to otherwise set controls. In another embodiment, the brush 310 may communicate directly with the server, via network connection 326, or a plug-in connection into a computer system. Other mechanisms of updating the brush settings may be utilized.

FIG. 4A-4D are diagrams of embodiments of the user interface for the hybrid brush. The brush interface may allow the user to set the rotation and vibration in various ways. In one embodiment, the user interface may have a plurality of presets, each preset associated with a particular rotation speed and vibration level, and ratio between rotation and vibration, referred to as preset adjustor. In one embodiment, the user interface may permit adjustment of the rotation speed/vibration ratio, referred to as ratio adjustor. In one embodiment, the user interface may permit continuous adjustment of the rotation speed and separately the vibration level, referred to as direct adjustor.

In one embodiment, there may be multiple preset speed/ratio settings for the brush. In the configuration shown in FIG. 4A, there are six settings. A setting, for example, may be rotation speed: 400 rpm (rotations per minute), vibration speed 10,000 ppm (pulses per minute), for a ratio of 250 p/r. A different setting may be 2000 rpm, with a vibration speed of 2000 ppm for a ratio of 1. In one embodiment, these settings may be configured via a mobile device, or computer application.

Figure 4A:
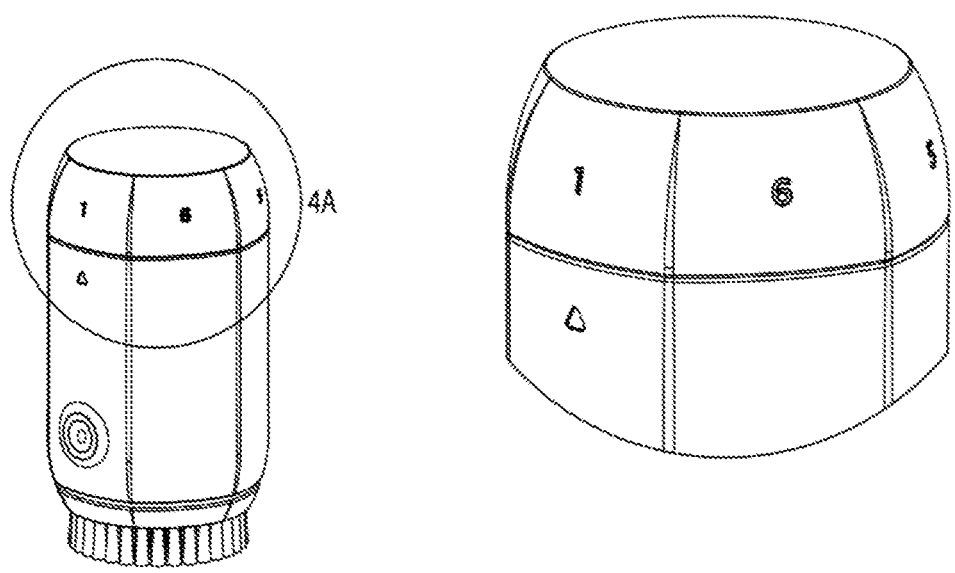
FIGS. 4A-4D are diagrams of various embodiments of the user interface for the hybrid brush.
Figure 4B:
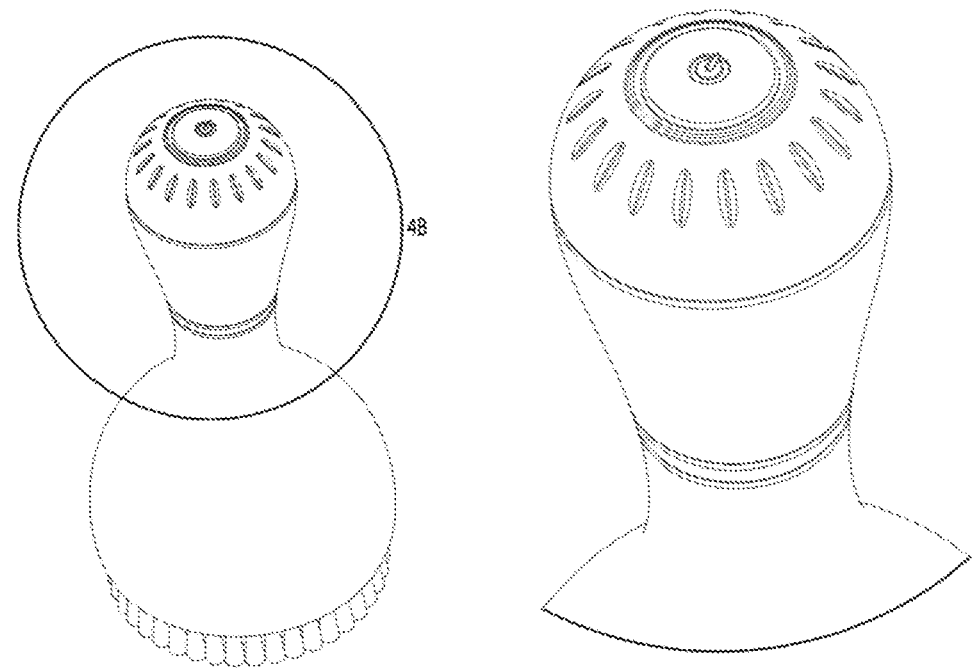

FIG. 4B illustrates another user interface, with 20 separate settings. In one embodiment, the settings may indicate the speeds/ratios.

Figure 4C:
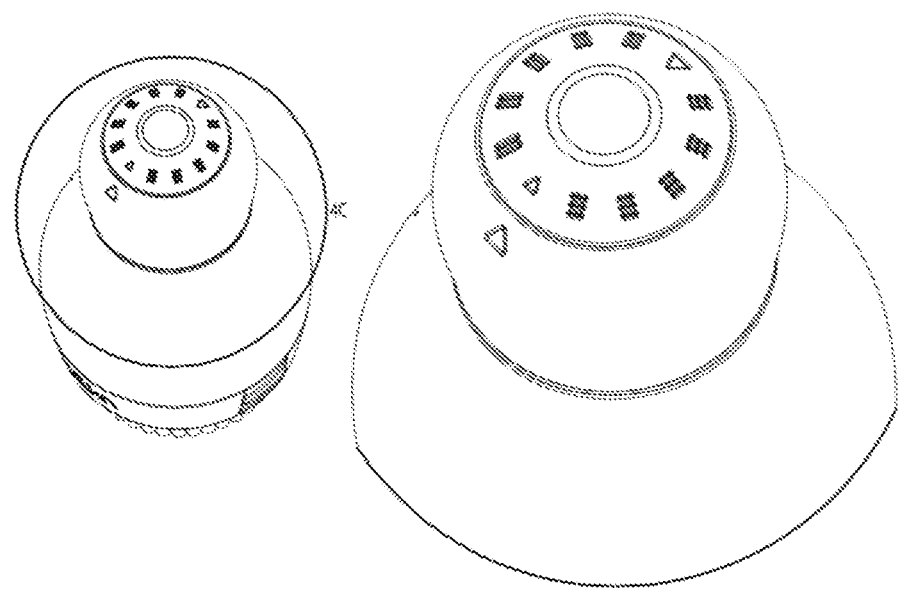

FIG. 4C illustrates another user interface, which shows the "sonic" focused settings on one side, and the "rotation" focused settings on the other side. In one embodiment, the speed of the rotation remains the same on the sonic side, and the speed of the vibration remains the same on the rotation side, as the other aspect is adjusted. In another embodiment both the sonic and rotation are adjusted, on both sides, but the relative percentages of sonic and rotation are different, on the sides of the brush.

Figure 4D:
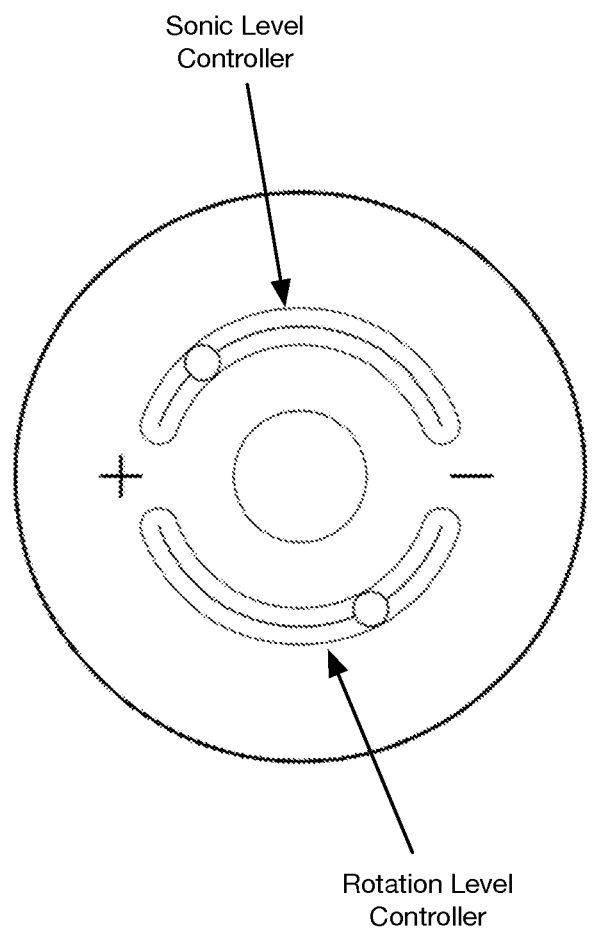

FIG. 4D illustrates another user interface, which shows double sliders, that enable the user to separately adjust the rotation speed and vibration speed. This provides full control to the user. Other methods of implementing the user interface may be utilized. In one embodiment, the consistent factors are that both the rotation speed and the sonic vibration level is adjustable, to multiple settings. The user may adjust based on the actual speed/level, based on a ratio, or a combination.

Figure 5:
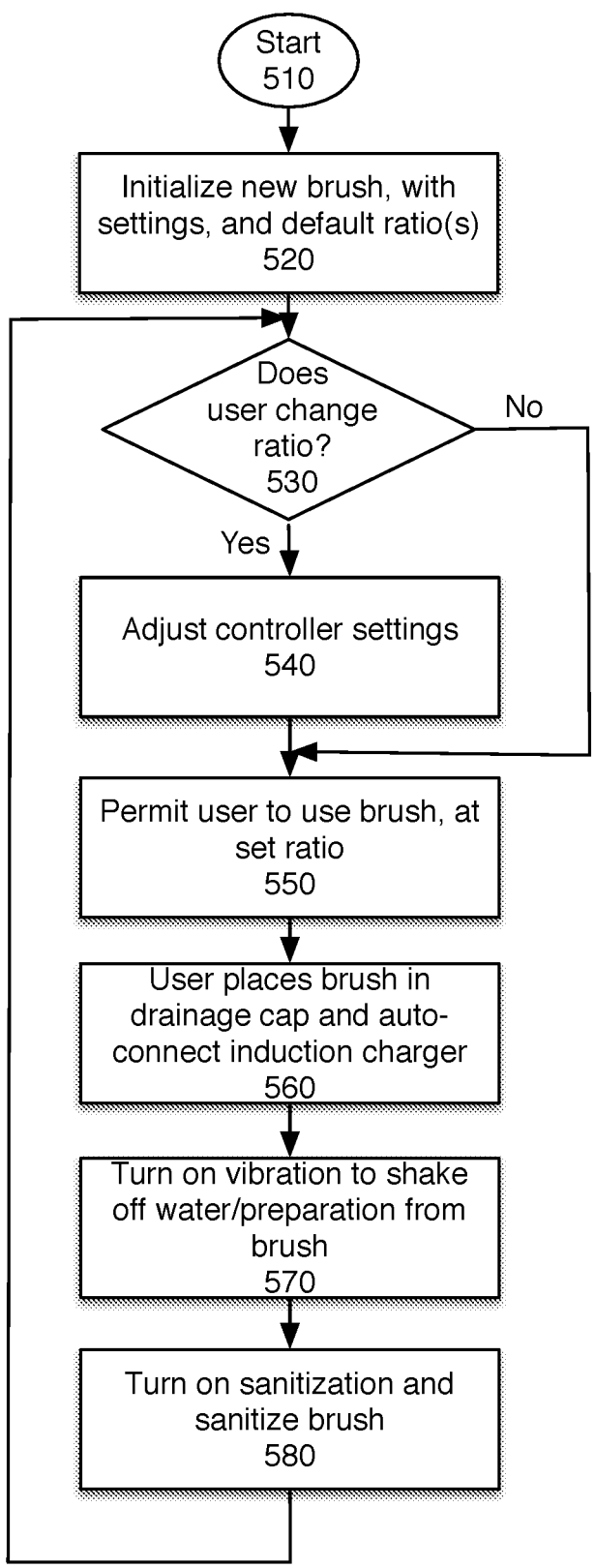
FIG. 5 is a flowchart of one embodiment of using the brush, with a drainage cap.

FIG. 5 is a flowchart of one embodiment of using the brush, with a drainage cap. The process starts at block 510. In one embodiment, this process starts when the user initially purchases a new brush. At block 520, the new brush is initialized with a default ratio, and default settings for the ratios. In one embodiment, this may be done in the factory. In one embodiment, this may be done automatically when the user links the new brush to a mobile application. In that case, the user's previous preferences may be considered the "default" ratios for the new brush. This enables a user to purchase a new brush, but maintain his or her preferred settings.

At block 530 the process determines whether the user changed the ratio. If so, at block 540 the settings are adjusted. As noted above, the motor controller controls the relative settings of the vibration and rotation. The process then continues to block 550. If the user does not change the settings, the process continues directly to block 550.

At block 550, the user can utilize the brush at the preset ratio. Using the brush, in one embodiment, means utilizing it with a preparation, dry, or with water. In one embodiment, for a facial brush, the system may have a timer, which encourages use for a certain time.

At block 560 the user places the brush in the drainage cup, after use. The induction charger is auto-connected, in one embodiment.

At block 570, the brush turns on, in one embodiment, the vibration motor only, to shake off the water and any remaining preparation from the brush head. This speeds drying and ensures that the brush is ready to use the next time the user wishes to use it.

At block 580, the sanitization is turned on. This ensures that the brush head does not have bacteria which can lead to skin damage over the long term, and also make it smell bad. In one embodiment, the sanitization is UV, or microwave. In one embodiment, the sanitization turns on long enough to ensure that the brush head is clean. In an alternative embodiment, sanitization may be done with a liquid, such as alcohol. The process then returns to block 530, to monitor whether the user picks up the brush and adjusts the ratio, or turns it on fro use. In this way, the system provides an always-ready dual motor brush that provides the correct level of rotation and vibration for optimal cleaning, skin stimulation, exfoliation, or other appropriate uses for a brush.

Figure 6:
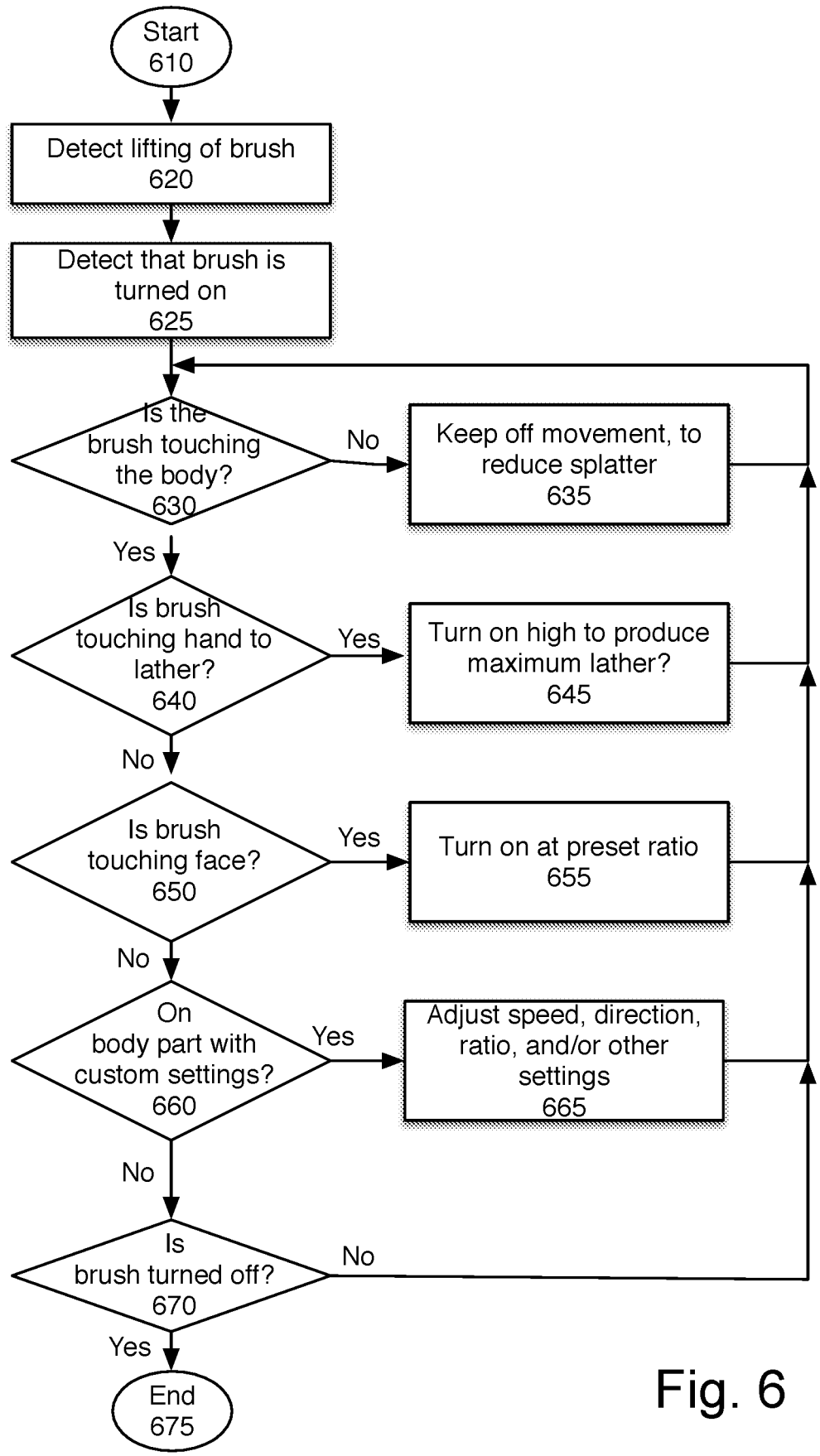
FIG. 6 is a flowchart of one embodiment of using the brush, with sensors.

FIG. 6 is a flowchart of one embodiment of using a dual motor brush, with sensors. The process starts at block 610. In one embodiment, the process starts when the brush is active, meaning it is powered and ready to be used. At block 620, the system detects that the brush is lifted, in one embodiment. This may be detected based on data from a motion sensor, barometer, or based on a disconnection of the brush from the charging station.

At block 625, the system detects that the brush has been turned on. In one embodiment, this is detected based on the user activating the brush, in one embodiment by pressing the "start" button.

At block 630, the process determines whether the brush is in use, for a facial brush touching the body, and for another type of brush touching the surface on which it is going to be used. If not, at block 635 the brush is kept "off" (not rotating or vibrating) to reduce splatter. In one embodiment, the system may not turn off sonic vibration even if the brush is not touching the body, since that does not cause the wide splatter that rotation does. The process then returns to block 630, to continue monitoring. In one embodiment, this is designed to enable the user to turn on the brush while looking at the user interface, prior to placing the brush on the face (or wherever it will be used) without causing a big mess.

At block 640, in one embodiment, the process determines whether the brush is touching the user's hand, or another location for lathering, such as a dispenser of a soap. This is generally done to produce lather, prior to applying a cleansing foam to the face. Creating lather requires motion of the brush. If the brush is touching the user's hand, at block 645 the brush is turned on to high, to quickly produce light and foamy lather. In one embodiment, the brush may be turned on to vibration only. In one embodiment, the brush may be turned on to rotation only, to create the lather. The process then continues to block 630 to continue monitoring.

At block 650, the process determines whether the brush is touching the user's face, or another location where the brush would be used, like a sink, floor, etc. If so, at block 655 the brush is turned on to the preset vibration/rotation ratio. As discussed above, the speed and ratio may be set by the user, based on the preparation used, based on user characteristic data, or as a default. The process then returns to block 630 to continue monitoring.

At block 660, the process determines whether the brush is at a location having a custom setting. In one embodiment, this may be detected based on a combination of sensor data, such as pressure sensors, accelerometers, touch sensors, and/or other sensors. In one embodiment, some portions of the face have custom settings. For example, the crease of the nose is best cleaned rotating outward away from the face. The sensitive skin under the chin area does not tolerate rotation well, while the forehead does. In one embodiment, some body parts may have associated custom settings for the speed and ratio of the motors. For a non-facial brush, the system would detect a location such as a curved area, a corner, or similar shape where custom settings may be useful, could be detected. If the system detects that the brush is on such a body part, at block 665 the speed, direction, ratio, and/or other settings are adjusted. The process then returns to block 630 to continue monitoring.

At block 670, the process determines whether the brush has been turned off. In one embodiment, the brush may be turned off by the user. In one embodiment, the brush may have a timer and automatically turn off after a preset period. If the brush is not turned off the process returns to block 630. Otherwise, the process ends at block 675.

Of course, though this is shown as a flowchart, in one embodiment it is implemented as an interrupt-driven system, such that the device recognizes any of the defined occurrences happening, and adjusts accordingly. Additionally, the ordering of evaluation of any such occurrences is arbitrary. This is also true of the other flowcharts in this application, unless there is a clear dependency defined.

Figure 7:
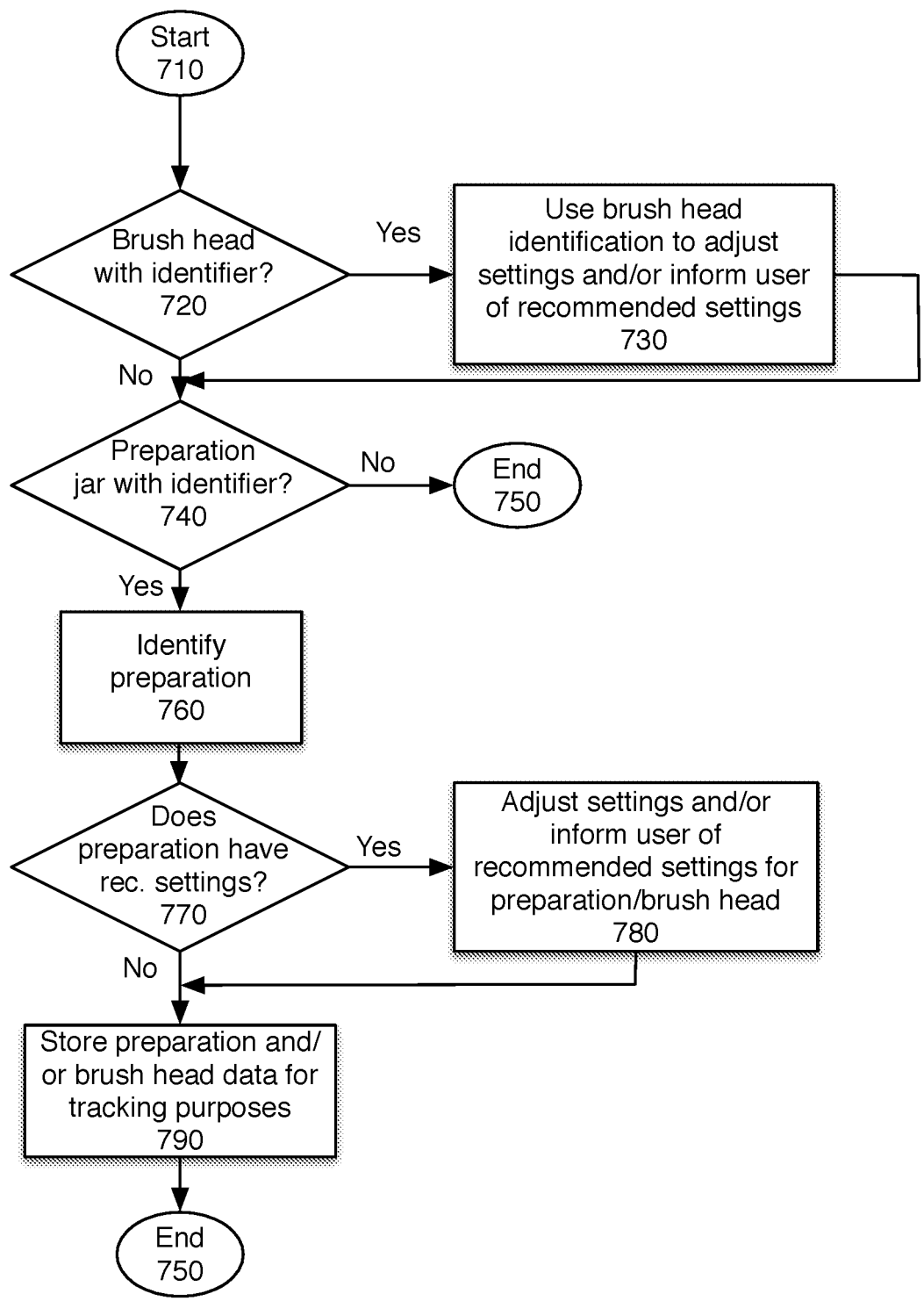
FIG. 7 is a flowchart of one embodiment of using the brush with a linked preparation.

FIG. 7 is a flowchart of one embodiment of using the brush with a linked preparation jar and/or brush head. The process starts at block 710.

At block 720 the process determines whether there is a brush head identifier. In one embodiment, brush heads may have an RFID, mechanical identification, or other way to indicate what kind of brush head they are, to the brush. If there is a brush head identifier, at block 730 the system uses the brush head data to adjust the settings (speed, direction, ratio), and/or inform the user about the recommended settings for the particular brush head. The process then continues to block 740. If there is no brush head identifier, the process continues directly to block 740.

At block 740, the process determines whether the preparation jar has an identifier. In one embodiment, the preparation jar would have a passive identifier, which could be read by the reader in the brush, when the brush is dipped into the preparation. In one embodiment, the drainage cap may include the reader and communicate the identification to the brush head. If the preparation does not have an identifier, or there is no preparation, the process ends, at block 750. In one embodiment, the brush head identification is stored, for tracking purposes.

It there is a preparation identifier, at block 760 the particular preparation is identified. In one embodiment, various lotions, cleansers, astringents, and other types of preparations may be used with the brush, if it is a facial brush. For a cleaning brush, the various types of cleaner, disinfectant, and other types of materials that may be used with the brush may be identified.

At block 770, the process determines whether the preparation has recommended settings. In one embodiment, some preparations have associated "best" settings. For example, for a thick lotion designed for sensitive skin, the speed of rotation may be very low, with a relatively high sonic vibration level, compared to a foaming cleanser which has a higher rotation and lower vibration rate.

If there is a recommended setting for the preparation, at block 780 the settings are adjusted, or the user is informed of the recommended settings for the preparation. In one embodiment, the system creates a combined recommendation, based on the brush head and preparation. The process then continues to block 790.

At block 790, the preparation data, and brush head data when available, is stored for tracking purposes. In one embodiment, the system tracks the user's utilization and enables the user to see how their use impacts their skin. In one embodiment, the use of the various preparations is tracked as well. This may enable users to arrive at the optimal combination of speed/ratio of the brush, brush head, and preparation for their particular circumstances. In one embodiment, users may share this data with each other, via the mobile application or a web site. The process then ends at block 750.

Figure 8:
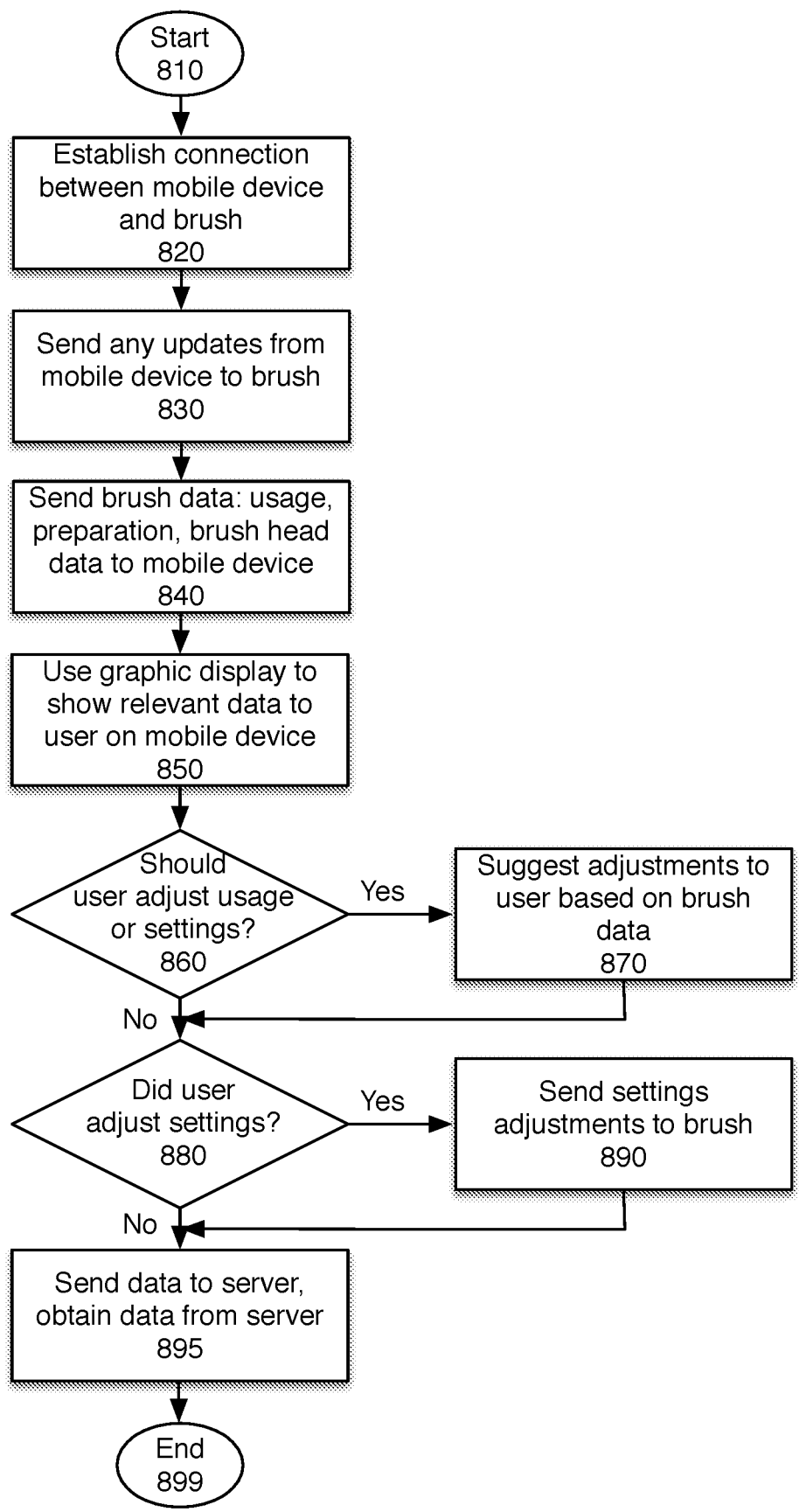
FIG. 8 is a flowchart of one embodiment of using the brush with a mobile device.

FIG. 8 is a flowchart of one embodiment of using the brush with a mobile device. The process starts at block 810. At block 820, a connection is established between the mobile device and brush. In one embodiment, this occurs when the user manually indicates that the mobile device should sync with the brush. In one embodiment, this may occur whenever the mobile device is in range of the brush, and both have sufficient power to synchronize. In one embodiment, this occurs when the user opens the brush application on the mobile device, and the mobile device is in range of the brush.

At block 830, data is synchronized between the brush and the mobile device/application. In one embodiment, any updates from the server are sent by the mobile device to the brush. Such updates may include identification of new preparations and/or brush heads, restrictions or changes in ratio or speed for rotation or vibration, and any other updates. In one embodiment, such updates are obtained from the server.

At block 840, in one embodiment usage data, brush head data, and preparation data is sent by the brush to the mobile device. This may include all settings and use data collected by the brush, and associated with a particular time. This enables the mobile device, in one embodiment, to output a timeline of brush use.

At block 850, a graphic display is used to show relevant data to the user, utilizing the richer user interface of the mobile device. In one embodiment, the graphic display may show the regularity of use, how long the brush was used, the type(s) of preparations and brush heads used, etc. In one embodiment, the user may add opinion data, for example improvements or problems which were observed.

At block 860, the system analyzes whether the user should adjust usage or settings. Adjusting usage may include using the brush for a longer or shorter time, at a different time of day, using less or more pressure, etc. Settings may include using a different brush head, using a different preparation, etc. In one embodiment, this determination is made on the mobile device. In one embodiment, this determination is made on a server, based on anonymized data provided by the mobile device to the server, via the application. In one embodiment, this determination is based on recommended behaviors for someone having the user characteristics of the user in question. In one embodiment, the recommendations are based on user recommendations. For example, users may indicate that they have experienced less acne after using a particular combination of settings, brush head, and preparation. A user who indicates that he or she has acne may be suggested to follow the path previously recommended by another user.

If there is a suggested change in behavior, at block 870, the adjustment or change in use or configuration is suggested to the user. In one embodiment, if the suggestion is a change of speed/ratio, the system may alternatively automatically send the updated settings to the brush.

At block 880, the process determines whether the user changed the settings of the brush. In one embodiment, the brush user interface provides only a selected set of speed/ratio settings for the two motors. For example, the interface may provide six settings, ranging the rotation between 60 rpm and 1000 rpm, and ranging vibration between 1000 ppm and 40,000 ppm. When the user only has access to a set number of pre-selected speed/ratio settings, in one embodiment, the user may alter these presets using the mobile device. In one embodiment, this may be done manually by the user, by entering a vibration and rotation speed. In one embodiment, this may be done by accepting one or more recommendations, based on the analysis as described above. If the user alters the settings, at block 890 the new settings are sent to the brush. In one embodiment, this means that same settings may subsequently have a different speed and ratio associated with it.

At block 895, data is sent to the server and when appropriate data is obtained from the server. In one embodiment, the usage data is sent to the server to enable the server to collect aggregate data. In one embodiment, the server may also provide processing to generate recommendations. As noted above, the server may also send new data for the brush memory, such as identification of new preparations or brush heads, recommendations of new settings, etc. Note that although this element is toward the end of the flowchart, the communication between the mobile device and the server may be continuous when the application is open on the mobile device, and network is available. The process then ends at block 988.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

We claim:

1. An apparatus comprising:
    a first motor and a second motor in a body of the apparatus;
    a planetary gear system in the body of the apparatus, the planetary gear system including a sun gear, a ring gear, and planetary gears, wherein the first motor is coupled to the sun gear to drive movement of the sun gear in the planetary gear system to control rotation, and the second motor is coupled to the ring gear to drive movement of the ring gear in the planetary gear system to control vibration, and wherein the sun gear and the ring gear drive the planetary gears, and the planetary gears combine the rotation from the first motor and the vibration from the second motor; and
    a carrier coupled to the planetary gear system to move a moving portion of the apparatus, the moving portion coupled to a head, the head designed to be in contact with a user when the apparatus is in use.

2. The apparatus of claim 1, wherein the head comprises a brush head, and the apparatus is a skin brush.

3. The apparatus of claim 2, wherein the brush head of the skin brush comprises one of bristles, massagers, a rough surface, nubs, silicone, fibers, a disk, and a pad.

4. The apparatus of claim 2, wherein the brush head of the skin brush is adapted for one or more of applying a preparation, exfoliation, microdermabrasion, massaging, and acne management.

5. The apparatus of claim 1, wherein the apparatus comprises a hairbrush, wherein the body of the apparatus comprises a handle of the hairbrush and the head comprises bristles of the hairbrush.

6. The apparatus of claim 5, wherein the bristles of the hairbrush rotate and vibrate.

7. The apparatus of claim 1, wherein the head comprises a toothbrush head, and the apparatus is an electric toothbrush.

8. The apparatus of claim 7, wherein the head includes a plurality of bristles, and the bristles of the toothbrush rotate and vibrate.

9. The apparatus of claim 1, wherein the head comprises a massager head, and the apparatus is a massager.

10. The apparatus of claim 9, wherein the head is a massager head that rotates and vibrates.

11. The apparatus of claim 9, wherein a combination of the rotation and the vibration produces microrotations.

12. A skin brush comprising:
    a body designed to be held by a user, and a head coupled to the body designed to be applied to skin;
    a first motor and a second motor in the body of the skin brush;
    a planetary gear system in the body of the skin brush, the planetary gear system including a sun gear, a ring gear, and planetary gears, wherein the first motor is coupled to the sun gear to drive movement of the sun gear in the planetary gear system to control rotation, and the second motor is coupled to the ring gear to drive movement of the ring gear in the planetary gear system to control vibration, and wherein the sun gear and the ring gear drive the planetary gears, and the planetary gears combine the rotation from the first motor and the vibration from the second motor; and
    a carrier coupled to the planetary gear system to move a moving portion of the skin brush, the moving portion coupled to the head, the head designed to be in contact with the skin when the apparatus is in use.

13. The skin brush of claim 12, wherein the head of the skin brush comprises one of bristles, massagers, a rough surface, nubs, silicone, fibers, a disk, and a pad.

14. The skin brush of claim 12, wherein the head of the skin brush is adapted for one or more of applying a preparation, exfoliation, microdermabrasion, massaging, and acne management.

15. The skin brush of claim 12, wherein the head of the skin brush is adapted to be a massager.

16. A hairbrush comprising:
    a brush handle and a brush head, the brush head including a plurality of spokes;
    a first motor and a second motor in the hairbrush;
    a planetary gear system, the planetary gear system including a sun gear, a ring gear, and planetary gears, wherein the first motor is coupled to the sun gear to drive movement of the sun gear in the planetary gear system to control rotation, and the second motor is coupled to the ring gear to drive movement of the ring gear in the planetary gear system to control vibration, and wherein the sun gear and the ring gear drive the planetary gears, and the planetary gears combine the rotation from the first motor and the vibration from the second motor; and
    a carrier coupled to the planetary gear system to move a moving portion of the hairbrush, the moving portion coupled to the brush head, the brush head including the plurality of spokes designed to be in contact with a user when the apparatus is in use.

17. The hairbrush of claim 16, wherein the spokes of the hairbrush comprise one of bristles, silicone, and fibers.

18. The hairbrush of claim 17, wherein the bristles in the head of the hairbrush are designed to move in microrotations combining the rotation and the vibration.

* * * * *